R. C. SCHEMMEL

June 3, 1930. ORNAMENTAL CONDUCTOR FOR ELECTRIC WIRES Re. 17,691

Original Filed June 27, 1928

Inventor

Robert C. Schemmel.

Witness

Edwin L. Bradford.

By Wm. C. Dyer.

His Attorney

Reissued June 3, 1930

Re. 17,691

UNITED STATES PATENT OFFICE

ROBERT C. SCHEMMEL, OF UNION CITY, INDIANA

ORNAMENTAL CONDUCTOR FOR ELECTRIC WIRES

Original No. 1,713,302, dated May 14, 1929, Serial No. 288,747, filed June 27, 1928. Application for reissue filed January 13, 1930. Serial No. 420,617.

My invention relates to the insulation of electric wires, but has reference more particularly to an ornamental conduit or container for such wires which would otherwise be exposed to view and more or less unsightly.

Of course when electric wires are concealed within the walls, floors or partitions of dwellings, office buildings or other structures, there is no particular object in locating them in an ornamental container, but when used in surface wiring the matter of appearance becomes one of importance, as does also the means of securing such containers in operative position, as, for example, when installing signal bells or radio connections in an old or completed building.

An object of the present invention is, therefore, the production of conduits for wires which are not only highly ornamental, but which are at the same time quickly and securely fastened to washboards, door frames, window frames and the interior trim generally.

Wires of the character indicated, when of surface application, are sometimes twisted together into a two-strand cable and fastened in position by means of tacks passed between said twisted strands, and, of course, clear of the wires themselves. At other times the wires are merely stapled into operative position, or are arranged in parallelism, being then bound together and to the supporting framework by suitable brackets, but usually such fastening means are exposed to view and sometimes are very unsightly.

As a further object the present invention contemplates and provides ornamental and efficient means for concealing and insulating electric wires, and at the same time means for concealing the fastening means whereby the conduit itself is held in operative position.

A further object of this invention is the production of means whereby electric conducting wires are enclosed within independent floating tubular jackets, the latter in turn each being united, along one longitudinal side line only, to an attaching base portion by which the completed structure may be secured in operative position.

In the accompanying drawings which form part of this application for Letters Patent and whereon like numerals indicate corresponding parts in the several views.

Figure 1:
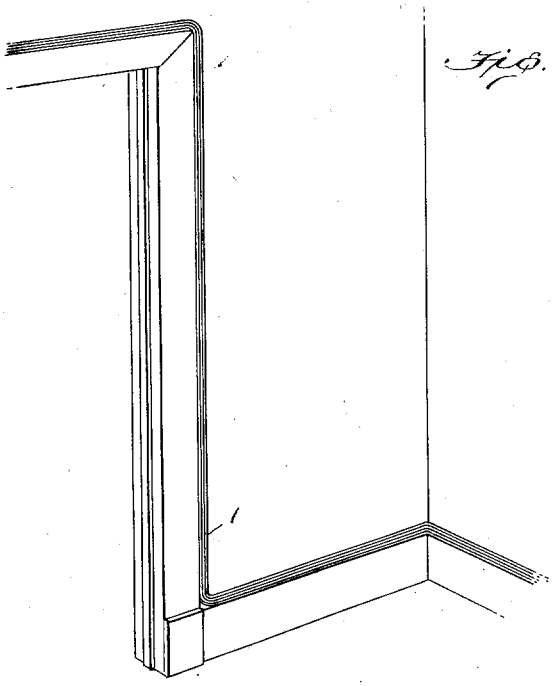
Figure 1 is a perspective view showing one corner of the interior of a room, a washboard and part of a door frame, with a section of the improved wire conductor adjacent to said washboard and door frame in position for use.

Reference being had to the drawings and numerals thereon, the conduit is formed of a covering fabric of leather, leatherized cloth or any material which is characterized by suitable flexibility. The covering material may be of any color or combination of colors and provided with any desired surface ornamentation to harmonize with the woodwork or trim of the room in which it is to be located, or with the interior hangings or furnishings of the room.

The covering fabric is folded upon itself to provide a base portion 1, reinforced and stiffened, if desired, by the inclusion of a filler strip 2, and, in the embodiment of my invention illustrated by the accompanying drawings, terminating above in two parallel contacting centrally positioned rolls or tubular beads 3, 3. In these beads are located the independent electric wires 4, 4, which in turn may be further insulated and spaced apart by agency of a non-conducting filler, such for example, as the rubber tubing 5 and a surrounding covering 6 of silk or the like.

Since the sole function of the wires 4 is to carry an electric current, it is obvious that these wires will in practice be formed of a material of high electrical conductivity. As is well known in the art, copper and its alloys constitute at the present time the most efficient known commercial conducting materials, and accordingly I prefer to provide wires 4 of copper or its alloys.

Figure 4:
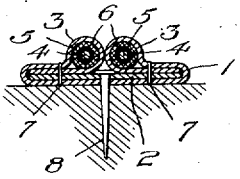
Fig. 4 is an end view of the invention showing one concealed securing tack driven through the body of the conductor and into the supporting trim.
Figure 2:
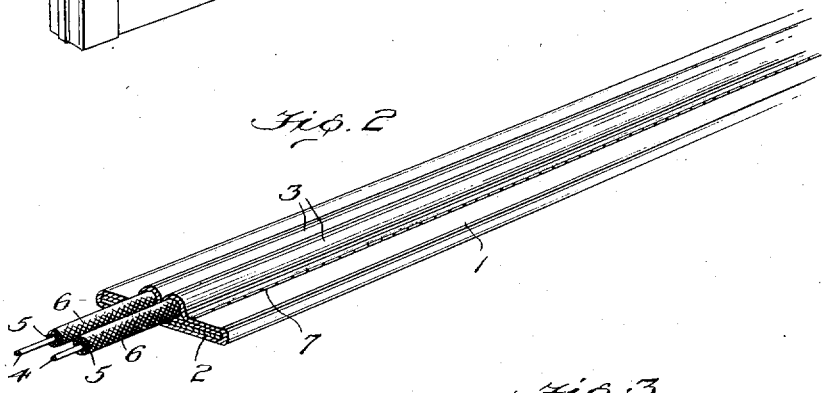
Fig. 2 is also a perspective view on a relatively enlarged scale showing one form of the present ornamental conductor insulator with insulated wires projecting somewhat from one end thereof.
Figure 3:
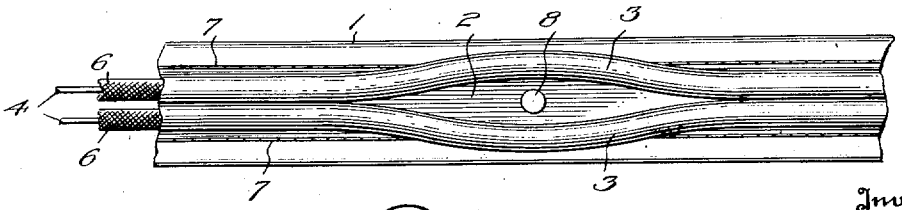
Fig. 3 is a view of the invention similar to Fig. 2 except that the container has been here temporarily deformed or spread at its central portion to admit a fastening tack.

Except for those portions of the device which contain the conducting wires and conceal the tack receiving portion of the base, as will presently be described, the conduit as a whole is of substantially flat or tape-like form. Both plies of the base portion 1, as also the filler strip 2, are firmly secured together by lines of stitches 7, 7, each arranged and positioned just outside of its respective bead portion 3 so that the latter may be forcibly lifted from the base portion, as shown by Fig. 3, to permit introduction of fastening tacks 8 as the means of attachment. Each bead 3 is capable of automatically returning to normal position, as shown by Figures 1, 2 and 4, when the spreading stress is removed, thus closing over the heads of tacks 8 to hide them from view, which is known as "blind-nailing."

Having thus described my present invention, its use, operation and advantages are quite obvious, but may be briefly stated as follows:

The present form of universally flexible conduit, having been constructed and arranged substantially as shown and described, efficiently insures the proper spacing at all times, and insulation of the conductor wires 4, 4, permanently located therein, and may be quickly, neatly and effectually applied to baseboards, door frames, or other trim elements, as indicated in Fig. 1 of the drawings, by the simple process of lifting the tack concealing beads 3 away from the base portion 1, and applying tacks 8 at suitable intervals, as shown. This accomplished, the said beads automatically close down over the tack heads to conceal them, whereupon the fastening is complete.

The structure shown and described hereinabove constitutes but one exemplification of my present invention, and I do not desire to be limited to the specific details of construction embodied therein. On the contrary, various modifications to meet varying conditions and requirements will suggest themselves to persons familiar with the art to which my invention relates, and these modifications are to be considered within the spirit of my invention and covered by the claims appended hereto. For example, it is not always necessary or desirable to use two electric conducting wires, a single wire being sufficient for some purposes, as in the case of the connection between a radio receiving set and its antenna, or its ground. For such use only one of the beads need contain an electric conducting wire. The other bead is then preferably not left empty, but may inclose any suitable filler, as, for example, twisted paper or cotton cord.

Again, it will be noted that the specific form of covering which I have illustrated in the accompanying drawings and described herein is similar to the structure known to the automobile body trimming trade as "Hidem" welt, which forms the subject of United States Letters Patent No. 1,226,600, granted to me May 15, 1917. I have shown and described "Hidem" welt as forming one element of my present invention merely because the combination of electric conducting wires with "Hidem" welt constitutes the best mode in which I have contemplated applying the principle of my present invention. It is to be understood, however, that any of the various types of relatively flat blind-nail finishing welts now available, or indeed which may be hereafter devised, may be used as the covering element of my present invention, the essence of which is the combination of electric conducting means with blind-nail ornamental covering therefor.

Having thus described my present invention, what I now claim and desire to secure by Letters Patent is:

1. An ornamental conduit for electric wires including a relatively thin tape-like base, in combination with wire-receiving tubular beads surmounting said base, arranged and adapted to be spread apart for the introduction of suitable fastening means and to automatically close over said fastening means when in final operative position, and an independent electric conducting wire in each of said tubular beads.

2. An ornamental flexible conduit for electric wires including a relatively thin tape-like base, in combination with wire-receiving tubular beads surmounting said base, arranged and adapted to be spread apart for the introduction of suitable fastening tacks and to automatically close over said tacks when in final operative position, and an independent electric conducting wire in each of said tubular beads.

3. An ornamental conduit for electric wires including in combination a base, a pair of wire-receiving tubular and contacting beads surmounting said base, adapted to be forcibly spread apart and to then automatically resume their parallel contacting relation, and an independent electric conducting wire in each of said tubular beads.

4. An ornamental conduit for electric wires including in combination a base, a pair of normally contacting beads surmounting said base adapted to be forcibly spread apart and to then automatically resume their parallel contacting relation, and an electric conducting wire in one of said beads.

5. A covering fabric arranged and adapted for blind nailing including a hinged bead portion, in combination with an electric conducting wire contained in said bead portion.

6. A blind nail finishing welt including a plurality of hinged beads in combination with electric conducting wires contained in said beads.

7. A blind nail finishing welt providing a base portion, a wire-enveloping bead portion superimposed upon said base portion, an electric conducting wire within said bead portion, and a hinged connection between said base and bead portions at one side only of the latter.

8. A blind nail finishing welt providing a base portion, a wire-enveloping bead portion, an electric conducting wire within said bead portion, and a hinge connection between said base and bead portions along one side only of the latter.

9. A blind nail finishing welt providing a base portion, a wire-enveloping bead portion, an electric conducting wire within said bead portion, and a hinged shock-absorbing connection between said base and bead portions along one side only of the latter.

10. In an electric conductor, an insulating jacket enclosing said conductor, and an attaching base to which said jacket is united in hinged arrangement along one longitudinal side line, the jacket being otherwise free.

11. In an electric circuit, the combination with conductor wires, of independent insulating jackets enclosing said wires one for each, and an attaching base to which said jackets are united in hinged arrangement along one side of each, the jackets being otherwise free.

12. In an electric circuit, the combination with conductor wires, of independent and floating jackets, one for each of said wires, and an attaching base to which said jackets are secured along their outer edges only.

13. An ornamental conduit for electric wires including in combination a covering fabric folded upon itself, an electric conducting wire contained within the folded covering fabric, a portion of the fabric being adapted to receive tacks for securing the conduit to a support, and another portion of the fabric being adapted to cover the tack receiving portion.

14. An ornamental conduit for electric wires including in combination a covering fabric folded upon itself, an insulating filler contained within the folded covering fabric, an electric conducting wire contained within the filler, a portion of the fabric being adapted to receive tacks for securing the conduit to a support, and another portion of the fabric being adapted to cover the tack receiving portion.

15. An ornamental conduit for electric wires including in combination a fabric folded upon itself to form a base having a tack receiving portion, another part of the folded fabric forming a portion adapted to conceal the tack receiving portion of the base, and electric conducting wires contained within folds in the fabric.

16. An ornamental conduit for electric wires including in combination a covering fabric folded upon itself, a copper wire contained within the folds of the covering fabric, a portion of the fabric being adapted to receive tacks for securing the conduit to a support, and another portion of the fabric being adapted to cover the tack-receiving portion.

In testimony whereof I affix my signature.

ROBERT C. SCHEMMEL.